Figure 1:
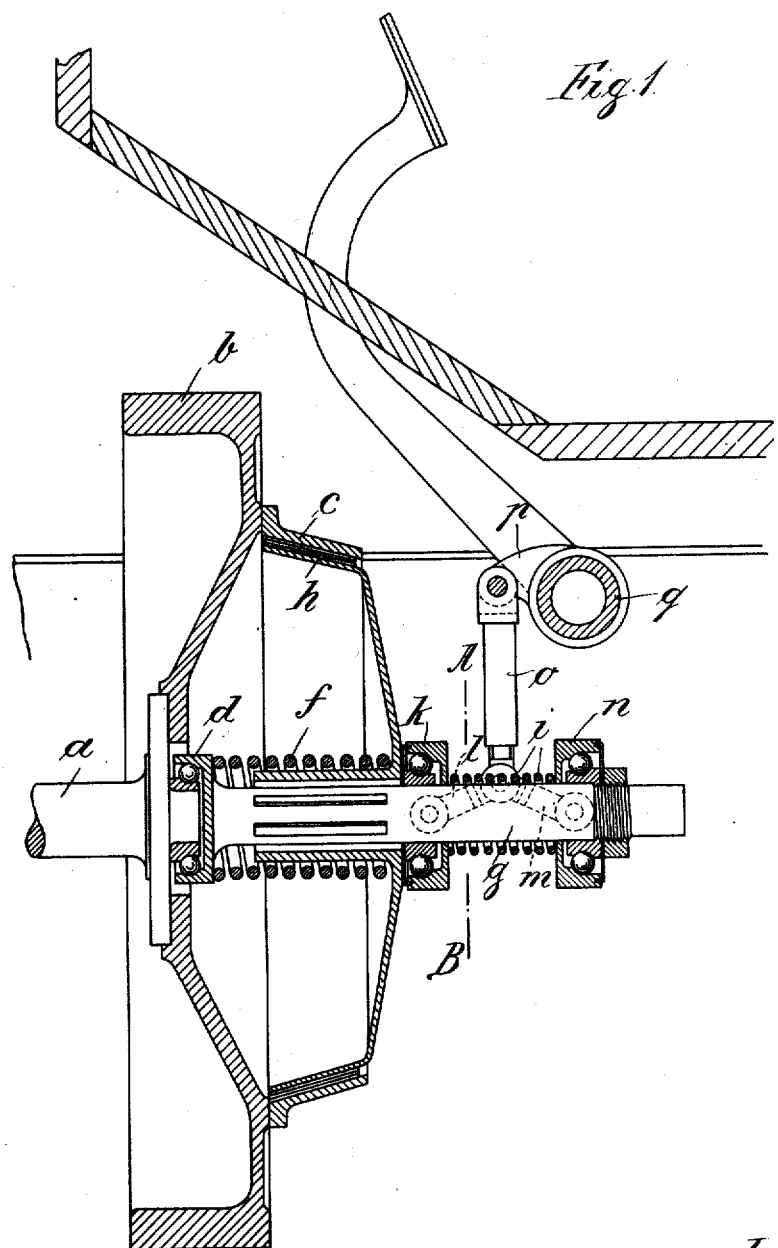

P. DAIMLER.
FRICTION CLUTCH.
APPLICATION FILED NOV. 15, 1910.

996,319.

Patented June 27, 1911.

2 SHEETS—SHEET 1.

Witnesses
Corinne Myers
Vera Paulsen

Inventor
Paul Daimler.
by L. K. Böhm,
Attorney

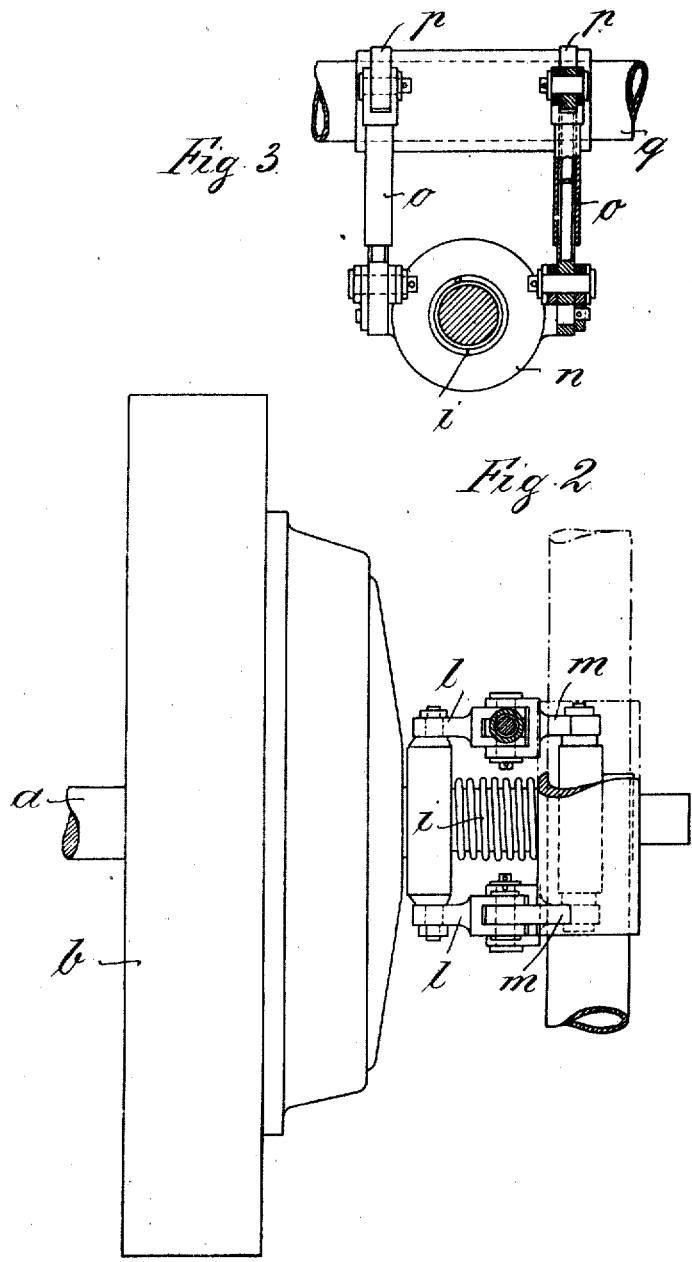

UNITED STATES PATENT OFFICE.

PAUL DAIMLER, OF UNTERTÜRKHEIM-STUTTGART, GERMANY, ASSIGNOR TO THE FIRM OF DAIMLER MOTORENGESELLSCHAFT, OF UNTERTÜRKHEIM-STUTTGART, GERMANY.

FRICTION-CLUTCH.

996,319.

Specification of Letters Patent. Patented June 27, 1911.

Application filed November 15, 1910. Serial No. 592,416.

*To all whom it may concern:*

Be it known that I, PAUL DAIMLER, a subject of the King of Würtemberg, and resident of Untertürkheim-Stuttgart, in the Kingdom of Würtemberg, German Empire, have invented certain new and useful Improvements in Friction-Clutches, of which the following is a specification.

The present invention relates to improvements in friction clutches of the type in which a friction cone is moved axially on its shaft against the action of a spring away from a corresponding conical surface secured on the other shaft when it is desired to open the clutch.

According to this invention the spring closed clutch is opened and released by toggle lever mechanism which engages on the one hand with the axially movable friction cone and on the other hand with a part on the shaft which carries this friction cone. By this means the shaft is freed from the load or pressure of the spring effecting the closing of the clutch and it need only be subjected to this pressure during the short period of time required for closing or opening the clutch.

An example of a form of construction of the subject matter of the application is shown in the drawing.

Figure 1 shows partly in side elevation and partly in vertical section, a clutch suitable for an automobile vehicle. Fig. 2 is a plan with the pedal for operating the clutch omitted. Fig. 3 is a section upon the line A—B of Fig. 1.

On the motor-shaft $a$ is mounted the flywheel $b$ which carries the hollow cone surface $c$ of the clutch or coupling. Against this hollow cone surface $c$ is pressed a friction cone $h$ axially movable on the driven shaft $g$, the cone $h$ being under the influence of the spring $f$ seated against a ball bearing cup or ring $d$. A ball bearing $k$ lies against the outer surface of the friction cone $h$ and this bearing $k$ is under the influence of a light spring $i$. The arms $l\ m$ of a toggle lever mechanism engage or are connected respectively with the ball bearing rings $k$ and $n$ on the shaft $g$, the ring $n$ being secured against axial displacement. Vertically movable rods $o$ are engaged with the joint of the toggle lever arrangement $l\ m$, the other ends of these rods being pivotally secured to arms $p$ of the foot lever shaft $q$.

The spring $f$ which tends always to move the friction cone $h$ to the right, presses this cone $h$ against the corresponding cone surface $c$ and thus normally maintains the clutch closed. When the clutch is to be opened the sliding rods $o$ are moved downward by pressing down the foot lever. Thereupon the toggle levers $l\ m$ by spreading apart, move the ball bearing ring $k$ and therefore also the friction cone $h$ to the left, so that the cone $h$ is removed from engagement with the cone surface $c$. Upon the releasing of the foot lever the spring $f$ returns the clutch parts back into the coupling position.

I claim—

1. A friction cone clutch comprising, in combination a shaft, a friction element fixed on said shaft and having a conical friction surface, a second shaft axially alined with said first shaft, anti-friction devices intermediate said shafts, a second friction element splined on said second shaft and having a conical friction surface, means for normally holding said friction surfaces in engagement, a fixed part on said second shaft and toggle lever mechanism operatively connected between said fixed part and said second friction element and operating to disengage said friction surfaces.

2. A friction cone clutch comprising, in combination a shaft, a friction element fixed on said shaft and having a conical friction surface, a second shaft axially alined with said first shaft, anti-friction devices intermediate said shafts, a second friction element splined on said second shaft and having a conical friction surface, means axially arranged intermediate said friction elements for normally holding said friction surfaces in engagement, a fixed part on said second shaft and toggle lever mechanism operatively connected between said fixed part and said second friction element and operating to disengage said friction surfaces.

3. A friction cone clutch comprising in combination a shaft, a friction element fixed on said shaft and having a conical friction surface, a second shaft, a second friction element splined on said second shaft and having a conical friction surface, means axially arranged intermediate said friction elements, for normally holding said friction surfaces in engagement, a collar loose on said second shaft, anti-friction devices intermediate said loose collar and said second friction element, a fixed part on said second shaft, a second collar loose on said second shaft but prevented from axial displacement, anti-friction devices intermediate said fixed part and said second loose collar, a light spring intermediate said collars and tending to maintain them in contact with the anti-friction devices, and means connected to said collars and operating to force them apart and thereby disengage said friction surfaces.

4. A friction cone clutch comprising in combination, a shaft, a friction element fixed on said shaft and having a conical friction surface, a second shaft, a second friction element splined on said second shaft and having a conical friction surface, means axially arranged intermediate said friction elements, for normally holding said friction surfaces in engagement, a collar loose on said second shaft, anti-friction devices intermediate said loose collar and said second friction element, a fixed part on said second shaft, a second collar loose on said second shaft but prevented from axial displacement, anti-friction devices intermediate said fixed part and said second loose collar, a light spring intermediate said collars and tending to maintain them in contact with the anti-friction devices, and manually operated toggle lever mechanism intermediate said collars and operating to force them apart and thereby disengage said friction surfaces.

5. A friction cone clutch comprising in combination a shaft, a friction element fixed on said shaft and having a conical friction surface, a second shaft axially alined with said first shaft, anti-friction devices intermediate said shafts, a second friction element splined on said second shaft and having a conical friction surface, means axially arranged intermediate said friction elements for normally holding said friction surfaces in engagement, a collar loose on said second shaft, anti-friction devices intermediate said loose collar and said second friction element, a fixed part on said second shaft, a second collar loose on said second shaft but prevented from axial displacement, anti-friction devices intermediate said fixed part and said second loose collar, a light spring intermediate said collars and tending to maintain them in contact with the anti-friction devices, and manually operated toggle lever mechanism intermediate said collars and operating to force them apart and thereby disengage said friction surfaces.

In witness whereof I have hereunto set my hand in the presence of two witnesses.

PAUL DAIMLER.

Witnesses:
ROBERT UHLAND,
ERNEST F. ENTENMANN.